United States Patent [19]

Gaudiana et al.

[11] Patent Number: 4,843,141

[45] Date of Patent: Jun. 27, 1989

[54] MELT-PROCESSABLE AROMATIC POLYESTERAMIDE HAVING REPEATING 2,2'-SUBSTITUTED BIPHENYLENE RADICALS

[75] Inventors: Russell A. Gaudiana, Merrimack, N.H.; Howard G. Rogers, Weston; Roger F. Sinta, Woburn, both of Mass.

[73] Assignee: Polaroid Corporation, Patent Department, Cambridge, Mass.

[21] Appl. No.: 138,064

[22] Filed: Dec. 28, 1987

[51] Int. Cl.$^4$ ............................................. C08G 63/68
[52] U.S. Cl. ................................ 528/183; 528/179; 528/182; 528/191; 528/192; 528/193; 528/194
[58] Field of Search ............... 528/183, 191, 192, 193, 528/194, 179, 182

[56] References Cited

U.S. PATENT DOCUMENTS

| 4,330,457 | 5/1982 | East et al. | 524/602 |
| 4,351,918 | 9/1982 | Charbonneau et al. | 524/602 |
| 4,355,132 | 10/1982 | East et al. | 524/602 |
| 4,384,107 | 5/1983 | Rogers et al. | 528/183 |
| 4,433,132 | 2/1984 | Rogers et al. | 528/191 |
| 4,446,305 | 5/1984 | Rogers et al. | 528/348 |
| 4,575,547 | 3/1986 | Rogers et al. | 528/191 |
| 4,608,429 | 8/1986 | Rogers et al. | 528/194 |

OTHER PUBLICATIONS

J. Preston, Journal of Polymer Science: Part A-1, vol. 8, pp. 3135-3144 (1970).
J. E. McIntyre, et al., The British Polymer Journal, Mar. 1981, pp. 5-10.
Y. Imai, et al., Journal of Polymer Science: Polymer Chemistry Edition, vol. 19, pp. 3285-3291 (1981).

Primary Examiner—Harold D. Anderson
Attorney, Agent, or Firm—Louis G. Xiarhos

[57] ABSTRACT

Melt-processable polyesteramides capable of exhibiting melt-phase anisotropy at temperatures of approximately 360° C. and lower are disclosed. The polyesteramides contain certain essential 2,2'-substituted biphenylene radicals and repeating units which provide ester and amide linkages. The polyesteramides exhibit melt processability suitable for processing into films and fibers.

23 Claims, No Drawings

MELT-PROCESSABLE AROMATIC POLYESTERAMIDE HAVING REPEATING 2,2'-SUBSTITUTED BIPHENYLENE RADICALS

BACKGROUND OF THE INVENTION

This invention relates to certain aromatic polyesteramides which exhibit desirable melt processability and which are useful in the production of films and fibers. More particularly, it relates to aromatic polyesteramides containing repeating 2,2'-substituted biphenylene radicals and aromatic radicals capable of providing ester and amide linkages, for the realization of anisotropic melt phases at temperatures of approximately 360° C. and lower, and preferably, below approximately 300° C.

The production of polyamides, polyesters and polyesteramides suitable for high strength service without the use of reinforcing agents has been well known. These polymers have been variously described as being "liquid crystalline", "thermotropic", "mesogenic", and "anisotropic". In general, these polymers are thought to be characterized by parallel ordering of their molecular chains and are prepared from monomers which are generally long, flat and fairly rigid along the long axis of the molecule. The monomers commonly have chain-extending linkages that are coaxial or parallel. Numerous patents and publications describing polyesters, polyamides and polyesteramides are cited, for example, in U.S. Pat. No. 4,351,918, issued Sept. 28, 1982 to L. F. Charbonneau, et al.

In general, it is well recognized that the mechanical and physical properties of polymeric films and fibers will depend upon the chemical structure of the monomers from which they are prepared and that such properties can be materially influenced by such molecular factors as chain stiffness, intermolecular forces, orientation and crystallinity. Accordingly, there has been considerable interest in the development of polyesters, polyamides and polyesteramides, having particular structural or molecular configurations for the realization of one or more particular properties suited to a desired application. Notably, there has been particular interest in the development of melt processable polymers capable of forming an anisotropic melt phase and suited to processing into films and fibers.

In the production of melt-processed films and fibers from polyesters and polyesteramides, melt processability is frequently hampered by the tendency of such materials to be melt processable only at elevated temperatures which, in some instances, may approach the onset of thermal degradation. In U.S. Pat. 4,575,547 (issued Mar. 11, 1986 to H.G. Rogers, et al.), and in U.S. Pat. 4,608,429 (issued Aug. 6, 1986 to H.G. Rogers, et al.), aromatic polyesters suited to melt processing into films and fibers are described. The polyesters of these patents are especially advantageous from the standpoint of their processability at lower temperatures, e.g., in the range of about 115° C. to to 250° C. The improved melt processability of these polyesters, relative to aromatic polyesters in general, which are only melt processable at higher temperatures, permits improved handling of the polymers and allows for the production of polymeric films and fibers. Frequently, however, it will be advantageous that a polymeric material exhibit a desirable balance of mechanical properties suitable for high strength service, while still being adapted to processing into films and fibers by general molding and melt processing methods without the need for solvent materials and the handling and recovery thereof. It will be appreciated that the advantageous properties of a polyesteramide suited to high strength service will be more readily realized where the polyesteramide material can be readily melt processed into films and fibers at practical processing temperatures.

SUMMARY OF THE INVENTION

The present invention provides a class of melt-processable polyesteramides capable of forming an anisotropic melt phase at a temperature of approximately 360° C. or lower. The polymers include certain essential 2,2'-substituted-4,4'-biphenylene radicals and aromatic radicals providing ester and amide linkages in the polyesteramide. Films and fibers combining a balance of properties suited to high strength service can be provided from the melt-processable polyesteramide materials.

According to the present invention, there is provided a melt-processable polyesteramide capable of forming an anisotropic melt phase at a temperature of approximately 360° C. or lower, comprising repeating units (I) and (II) and, optionally, repeating units (III) and (IV), wherein:

(I) is a repeating unit of the formula

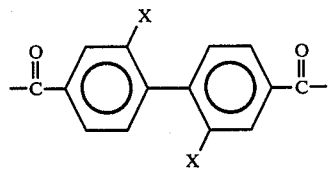

wherein X is a substituent other than hydrogen;

(II) is a repeating unit of the formula

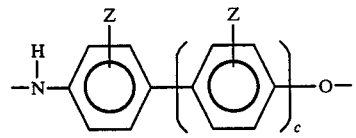

wherein each Z is hydrogen, alkyl, alkoxy, aryl, halogen or trifluoromethyl and c is zero or one;

(III) is a repeating unit of the formula

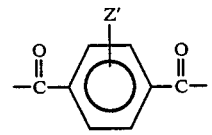

wherein Z' is hydrogen, alkyl, alkoxy, aryl, halogen or trifluoromethyl;

(IV) is a repeating unit of the formula

—Y—Ar—W— wherein Ar is a divalent arylene radical, Y is —O— or —NH— and W is —O—, —NH— or —C(O)—;
wherein the total number of equivalents of carboxylic groups in said repeating units (I), (III), and (IV) is equivalent to the total number of equivalents of amino and oxy groups in said repeating units (II) and (IV); wherein the repeating unit of formula (I) is present in an amount of 15 to 60 mole percent of said polyesteramide; wherein the repeating unit of formula (II) is present in an amount of from 30 to 60 mole percent of said polyesteramide; wherein the repeating unit of formula (III) is present in an amount of from 0 to 35 mole percent of said polyesteramide; and wherein the repeating unit of formula (IV) is present in an amount of from 0 to 10 mole percent of said polyesteramide.

DETAILED DESCRIPTION OF THE INVENTION

The polyesteramides of the invention contain a combination of certain essential divalent radicals of the formulas (I) and (II) and, in addition, certain optional radicals of formulas (III) and (IV). It will be seen from inspection of the formulas of the essential repeating units of formulas (I) and (II) that the polyesteramides of the invention are aromatic polycondensation products which include repeating units derived from a 2,2'-substituted-4,4'-biphenylene dicarboxylic acid (or corresponding acid halide or alkyl ester) along with repeating units derived from an aminophenol. In addition to the ester and amide linkages introduced into the polyesteramide by the polycondensation of monomers including the repeating units of formulas (I) and (II), the polyesteramides can optionally include the ester and amide linkages and the aromatic radicals introduced into the polymer by one or more monomers containing the repeating units represented by formulas (III) and (IV).

It will be appreciated that the various repeating units represented by formulas (I) and (IV) will be combined in the polyesteramides of the invention by a plurality of ester and amide linkages which are formed according to the requirements of stoichiometry. Thus, the total number of equivalents of carboxylic groups in repeating units (I), (III) and (IV) will be equivalent to the total number of equivalents of amino and oxy groups in the repeating units (II) and (IV). Stoichiometric requirements can be met by introducing into a polycondensation reaction mixture, sufficient quantities of each of the monomeric compounds providing the repeating units of formulas (I) to (IV), so that the total number of equivalents of carboxylic groups is substantially equal to the total number of equivalents of amino and oxy groups in such monomers. As used herein, the term substantially equivalent refers to a number of equivalents of carboxylic groups and combined amino and oxy groups which is in the range of from 0.9 to 1.1 times the exact stoichiometric equivalent. Thus, an excess or a deficiency up to about 10% is considered substantially equivalent. Excess unreacted reactant can be readily removed upon isolation of the desired polyesteramide.

The formula (I) divalent radical of the polyesteramides conforms, as indicated, to the formula

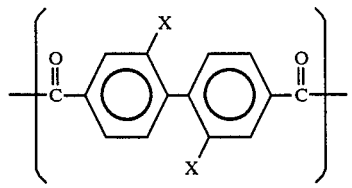

(I)

wherein each of the 2,2'-substituents is a substituent other than hydrogen. The formula (I) radical comprises an essential part of the polyesteramide and contributes to melt processability and to high strength and high birefringence observed in oriented films and fibers prepared therefrom. This radical (also referred to herein for convenience as including a 2,2'-substituted -4,4'-biphenylene radical) contains X substituents which promote a non-coplanar (or "twisted") molecular configuration with respect to the interbonded phenylene nuclei of the radical. This non-coplanarity is believed to be importantly related to the realization of high birefringence. The nature of substituent groups which promote high birefringence useful in optical devices has been described, for example, in U.S. Pat. 4,384,107 (issued May 17, 1983 to H.G. Rogers, et al.) and in U.S. Pat. No. 4,446,305 (issued May 1, 1984 to H.G. Rogers et at.).

Suitable X substituents include halogen (e.g., fluoro, bromo, chloro); nitro; alkyl (e.g., methyl, ethyl); alkoxy (e.g., methoxy); substituted-alkyl (e.g., trifluoromethyl or hydroxymethyl); cyano; hydroxy; thioalkyl (e.g., thiomethyl); carboxyl; sulfonic acid esters; sulfinic acid esters; carboxyamide, sulfonamide; amino; and acyl (e.g., acetyl). Preferred X substituents, which can be the same or different, include halo, nitro, alkoxy and substituted-alkyl (e.g., trifluoromethyl). An especially preferred X substituent is the aforementioned trifluoromethyl group which permits the production of polyesteramides exhibiting desirable birefringence and which promotes solubility of the polyesteramides in certain readily available solvent materials, such as tetrahydrofuran and dimethylacetamide. If desired, the phenylene nuclei of the formula (I) radical can contain additional substituent moieties, provided that such substituents do not adversely interfere with desired melt processability. Suitable substituents include those hereinbefore described in connection with the X substituent groups.

The formula (I) repeating unit will be present in the polyesteramides hereof at a concentration of from about 15 to 60 mole percent of the polyesteramide. The presence of the formula (I) repeating unit at a concentration of at least about 15 mole percent contributes importantly to the rigid-rod character of the polymer and to the stiffness and modulus of the polymeric material. A concentration of the formula (I) repeating unit of up to about 60 mole percent serves to control the rigidity and stiffness of the polymeric material such that the polymer can be melt processed at temperatures of about 360° C. and lower. A concentration in the range of from about 15 mole percent to about 60 mole percent also allows for the inclusion of other radicals, such as those represented by formulas (II), (III) and (IV), which serve to reduce the temperature at which melt processability of the polyesteramide is observed. A preferred concentration for the formula (I) repeating unit is from about 25 mole percent to about 50 mole percent.

The repeating unit represented by formula (II) serves to introduce into the polyesteramide material repeating para-oriented phenylene nuclei that contribute to a polymeric rigid-rod character and ester and amide linkages which interconnect the various aromatic nuclei of the aromatic polyesteramide. In the formula (II) radical,

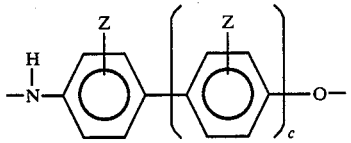

the Z substituents, independently of each other, can be hydrogen; alkyl, (e.g., methyl, ethyl, propyl, t-butyl), alkoxy (e.g., methoxy), aryl (e.g., phenyl, naphthyl); halogen (e.g., chloro, bromo); or trifluoromethyl. The nature of the interconnecting aromatic moiety of the formula (II) repeating unit will depend upon the value of subscript "c" which can be zero (to provide a monoaromatic para-oriented divalent radical) or the integer one (to provide a diaromatic para-oriented divalent interconnecting radical). Preferably, c will be zero.

The essential repeating unit of formula (II) is incorporated into the polyesteramide by including into the polycondensation reaction mixture an aromatic compound containing the essential amino and hydroxyl reactive groups. Suitable reactants for this purpose include 4-aminophenol, 2-methyl-4-aminophenol, 2-trifluoromethyl-4-aminophenol, 2-chloro-4-aminophenol, 2-methoxy-4-aminophenol and 4-hydroxy-4'-aminobiphenyl. Preferred reactants include 4-aminophenol, 2-methyl-4-aminophenol and 2-trifluoromethyl-4-aminophenol.

The formula (II) repeating unit is present in the polyesteramide at a concentration of from about 30 mole percent to about 60 mole percent of the polyesteramide. The concentration of the formula (II) repeating unit will be dictated largely by the stoichiometric requirements of the polyesteramide polycondensation reaction and, in general, will be present in an amount to satisfy the stoichiometric requirement of the formula (I) repeating unit and any other repeating unit which contains a carboxyl moiety. Preferably the concentration of the formula (II) repeating unit will be from about 40 to about 50 mole percent.

The formula (III) repeating unit is an optional repeating unit in the polyesteramide of the invention. This unit is derived from a substituted or unsubstituted terephthalate compound and serves, in general, to reduce the melting temperature of the polyesteramide. In the formula (III) radical,

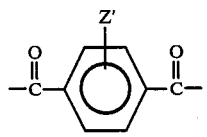

Z' can be hydrogen or a substituent other than hydrogen. Suitable substituent Z' groups are those described hereinbefore in connection with the Z substituents of the formula (II) repeating unit. Preferably, Z' will be hydrogen, i.e., the formula (III) repeating unit will be 1,4-phenylene dicarbonyl. Another preferred repeating unit is a repeating unit wherein Z' is trifluoromethyl. This preferred repeating unit contributes to a lowering of the melting temperature of the polyesteramide.

The concentration of the formula (III) repeating unit is in the range of from 0 to 35 mole percent of the polyesteramide. While the repeating unit is optional, it will generally be preferred from the standpoint of melt processability to include a content of repeating unit of the formula (III). A preferred concentration is in the range of from about 5 mole percent to about 25 mole percent of the polyesteramide. The particular concentration employed will depend in part upon the particular reactant utilized, and especially, on the nature of the substituent Z' group. The concentration will also depend upon the nature and concentration of other of the repeating units in the polyesteramide. For example, the content of formula (III) repeating units can be reduced to nil, while still retaining desired melt processability, by employing a formula (II) repeating unit wherein c is zero and the Z substituent is a substituent other than hydrogen. A preferred Z substituent for this purpose is the trifluoromethyl group.

The formula (IV) repeating unit also constitutes an optional repeating unit of the polyesteramide. In the repeating unit of formula (IV)

$$-Y-Ar-W-(IV)$$  (IV)

Ar represents a divalent radical comprising at least one aromatic ring. Suitable Ar radicals include the phenylene, biphenylene and naphthylene radicals. Preferably the Y and W groups of the formula (IV) repeating unit will be present on the Ar radical so as to provide a symmetrical aromatic repeating unit. By "symmetrical", is meant that the divalent bonds which join the formula (II) repeating unit to other repeating units in the main polymer chain of the polyesteramide are symmetrically disposed on one or more rings (e.g., are para to each other or diagonally disposed when present on a condensed ring system). Suitable Ar groups include p-phenylene, p,p'-biphenylene, and 2,6-naphthylene. The aromatic radical, Ar, of the formula (IV) repeating unit can be substituted or unsubstituted. As can be seen from inspection of the formula (IV) repeating unit, ester and amide linkages are introduced into the polyesteramide as the result of the Y and W groups thereof representing, in each case, oxy or amino, and additionally in the case of the W group, —C(O)—.

The Ar, Y and W moieties of the formula (IV) repeating unit are chosen such that the formula (IV) repeating unit has a different structure from the formula (II) repeating unit. Examples of monomeric compounds that can be used in a polycondensation reaction to introduce repeating units of formula (IV) include p-aminobenzoic acid, chlorohydroquinone, methylhydroquinone, chloro-phenylene diamine, 2,6-hydroxynaphthoic acid and 4,4'-diamino-biphenyl.

The concentration of the formula (IV) repeating unit in the polyesteramide can range from 0 to about 10 mole percent. In general, polyesteramides having desirable high-strength properties and good melt processability can be prepared by resort only to repeat units of formulas (I) and (II) and, optionally, (III). In some instances, it may be preferred, however, to include repeating units of the type represented by formula (IV). In general such units will be included for additional control of the desired melting temperature and will be used in minor amounts of up to about 5 mole percent of the polyesteramide.

While he polyesteramide of the invention has been described by reference to the repeating units of formulas (I) to (IV), the polyesteramide can also include repeating units which do not conform to formulas (I), (II), (III) or (IV). Examples of repeating units which do not conform to such descriptions and which can be present in the polyesteramides hereof, in proportions which do not undesirably elevate the melting temperature of the polyesteramide include repeating units of the following formulas (V), (VI) and (VII):

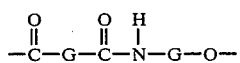 (V)

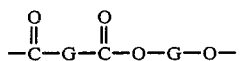 (VI)

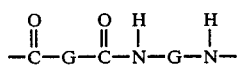 (VII)

wherein, for example, at least one of the divalent G radicals in each of the formulas represents an aliphatic radical or an aromatic radical other than the aromatic radicals recited in the repeating units of formulas (I) to (IV). Thus, in any of the repeating units of formulas (V), (VI) or (VII), each of the G radicals can be 1,2-ethylene; 1,2-propylene; 1,3-propylene; 1,4-phenylene; 1,3-phenylene; 4,4'-biphenylene; the stilbene radical of the formula;

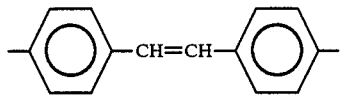

corresponding substituted-stilbene radicals; biphenylene radicals interbonded through methylene, ether, sulfone, sulfide or like group; trans-vinylene; ethynylene; 2,4'-trans-vinylenephenylene; and polyunsaturated divalent radicals such as trans,trans-1,4-butadienylene and 1,4-dimethyl-trans,trans-1,4-butadienylene.

It will be appreciated that the nature of the various repeating units incorporated into the polyesteramides hereof, including the formula (I), (II), and the formula (III) and (IV) repeating units (and any other optional repeating units of formulas (V) and (VI) and/or (VII) that may be present) will effect the properties observed in the polyesteramide material. Where the polyesteramide material is desirably employed as a birefringent layer in an optical device, it will be preferred that the presence of formula (V), (VI) and (VII) repeating units by avoided or minimized.

The formula (I), (II) and (III) repeating units contain aromatic radicals having essentially coaxial chain-extending bonds that are suited to the provision of a rigid, rod-like character. For example, aromatic radicals having para-oriented chain-extending bonds will be preferred where a rigid rod-like polymer exhibiting highly birefringent behavior in oriented films or fiber is desired.

Radicals having a flexible character such as alkylene radicals and biphenylene radicals interbonded through methylene, ether, sulfone, sulfide or the like, and phenylene radicals having ortho- or meta- oriented bonds, should be avoided where a birefringent polymer is desired, but can be included in the formula (IV), (V), (VI) and (VII) repeating units for predetermined modification of the properties of the polyesteramide materials. The inclusion of such radicals in the formula (IV), (V), (VI) and/or (VII) repeating units can, for example, be employed for further reduction in the melting temperature of the polyesteramide.

The polyesteramides of the present invention can be prepared by a solution polycondensation reaction. In general, the polyesteramides can be prepared by reaction of an aromatic dicarboxylic acid (or corresponding acid halide or alkyl ester) with an aromatic aminophenol according to known polycondensation methods. For example, a polyesteramide containing repeating units of the type represented by formulas (I) and (II) can be suitably prepared by the reaction of: (I) an aromatic dicarboxylic acid halide of the formula

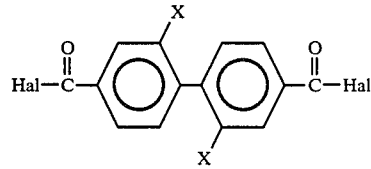 (Ia)

where Hal represents halogen, such as chloro or bromo, and each X has the meaning described in connection with the formula (I) repeating unit; and (II) an aminophenol of the formula

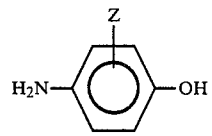 (IIa)

wherein Z has the meaning aforedescribed in connection with the formula (II) repeating unit. Additional compounds from the classes of dicarboxylic acids (or corresponding acid halide or alkyl esters), aminoalcohols, aminophenols, diols and/or diamines can be included in the reaction mixture to provide any of the optional repeating units referred to hereinbefore by formulas (III), (IV), (V), (VI) and (VII). Each of the monomeric compounds used in the polycondensation reaction mixture to introduce the corresponding and predetermined repeating units will be employed in concentrations appropriate to the provision of substantial stoichiometry.

In the case, for example, of a solution polycondensation reaction, the polyesteramide can be obtained by reaction of the aromatic dicarboxylic acid halide with the aromatic aminophenol in a suitable inert organic solvent and in the presence of a catalyst (or acid acceptor) which neutralizes hydrogen chloride formed, e.g., pyridine.

An inert organic solvent is utilized to dissolve the polyesteramide produced by the polycondensation reaction. Suitable solvents include chloroform, methylene chloride, 1,2-dichloroethane, 1,1,2,2-tetrachloroethane, dimethylsulfoxide, N,N-dimethylformamide and acetone. In general, the polyesteramide is obtained by reaction of one mole of the aminophenol with 1.0 to 1.05 moles of the aromatic dicarboxylic acid halide (or mixture thereof) in the organic solvent and in the presence of at least two moles of the acid acceptor. The polycondensation can be conducted at a temperature in the range of from about minus 20° C. to about 80° C. or higher, depending upon the boiling point of the solvent. Suitable acid acceptors include the tertiary amines, such as the trialkyl amines, e.g., triethylamine, or heterocyclic amines, e.g., pyridine.

The polyesteramides hereof can also be prepared by a known melt polycondensation technique whereby one mole of a diacetate of the aromatic amino phenol is reacted with 1.0 to 1.1 moles of the aromatic dicarboxyclic acid (or mixture) in the presence of a catalyst. The reaction mixture is heated in a stream of inert gas, e.g., nitrogen, to a reaction temperature between the melting temperature and the decomposition temperature of the monomers. The reaction pressure is reduced to below about 60 mm Hg for removal of acetic acid produced by the reaction. Further heating above the melting temperature of the polyesteramide product and reduction of the reaction pressure to below about 5 mm. Hg results in additional removal of acetic acid by-product. Organometallic compounds such as titanium dioxide, antimony trioxide and butyl orthotitanate can be suitably employed as catalysts for the melt polycondensation reaction.

Polyesteramides of the present invention can also be prepared by ester interchange according to generally known procedures. Thus, one mole of a dialkyl ester of the diaromatic dicarboxyclic acid (or mixture) can be reacted with from about 1.1 to 2.5 moles of aminophenol, generally at atmospheric pressure, although subatmospheric or superatmospheric conditions can be employed. Suitably catalysts for the ester interchange reaction, which is generally conducted over a range of from about 90° C. to about 325° C., include calcium acetate, sodium methoxide, antimony trioxide and tetraisopropyl titanate. During the ester interchange reaction, an alcohol is removed as a by-product and heating is continued to effect the polycondensation.

The polycondensation methods can be used to provide a variety of polyesteramides having the repeating units of formulas (I) to (VII). Among the preferred polyesteramides of the invention are the polyesteramides which have a melting temperature of about 300° C. or lower. Exemplary of such polyesteramides are the polymers consisting essentially of the repeating units illustrated in the following formula (VIII):

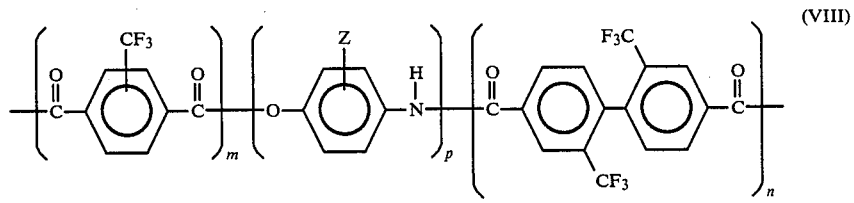
(VIII)

wherein Z is hydrogen, alkyl (e.g., methyl, ethyl, propyl, t-butyl), aryl (e.g., phenyl) or trifluoromethyl and each of m, p and n defines the respective molar amount of each of the repeating units of the polyesteramide. In the polyesteramides of formula (VIII), the "m" and "n" repeating units can be considered collectively as being derived from a difunctional aromatic acid (or halide), while the "p" repeating unit derives from an aminophenol. In the preferred polyesteramides of formula (VIII), the molar proportions of each of the "m", "p", and "n" repeating units conform to the following relationship:

$$\frac{m}{m+n} + \frac{n}{m+n} = 1 = \frac{p}{m+n}.$$

The particular molar proportions of each of the "m", "p" and "n" repeating units will depend upon the nature of the Z substituent of the "p" repeating unit. Thus, good melt processability can be obtained in a polyesteramide of formula (VIII) without the presence of the "m" repeating unit when the Z substituent of the "p" repeating unit is trifluoromethyl. In such a case, the "m" repeating unit is an optional unit and the following relationships apply:

$$\frac{m}{m+n} = 0 \text{ to } 0.75;$$

$$\frac{n}{m+n} = 0.25 \text{ to } 1;$$

$$\frac{p}{m+n} = 1$$

It will be preferred, however, to include a content of "m" repeating unit, in which case m/m+n will be in the range of from 0.25 to 0.75.

When the Z substituent of the "p" repeating unit is hydrogen, alkyl or phenyl, the preferred polyesteramides will have a content of "m" repeating unit. In such a case, the following relationships will apply:

$$\frac{m}{m+n} = 0.25 \text{ to } 0.75$$

$$\frac{n}{m+n} = 0.25 \text{ to } 0.75$$

$$\frac{p}{m+n} = 1$$

In the preferred polyesteramides of formula (VIII), the Z moiety will be hydrogen, methyl or trifluoromethyl. In these preferred polyesteramides, one or more aminophenol compounds can be used to introduce the desired content of "p" repeating unit. For example, the "p" repeating unit content of the polyesteramide can include the repeating units derived from a mixture of p-aminophenol, 2-methyl-4-aminophenol and 2-trifluoromethyl-4-aminophenol.

The preparation of polyesteramides hereof can be illustrated by the following reaction schemes:

Reaction 1(a) involving the solution polycondensation of 2-trifluoromethylterephthaloyl chloride, 2,2'-bis(trifluoromethyl)-4,4'-biphenyl dicarbonyl chloride and p-aminophenol in dimethylacetamide (DMAc) and methylene chloride (CH₂Cl₂) solvent, using triethylamine as an acid acceptor; and Reaction 1(b) involving the solution polycondensation of 2,2'-dibromo4,4'-biphenyl dicarbonyl chloride, and 2-trifluoromethyl-4-aminophenol, using DMAc and methylene chloride solvents and triethylamine acid acceptor.

Reaction 1(a)

-continued

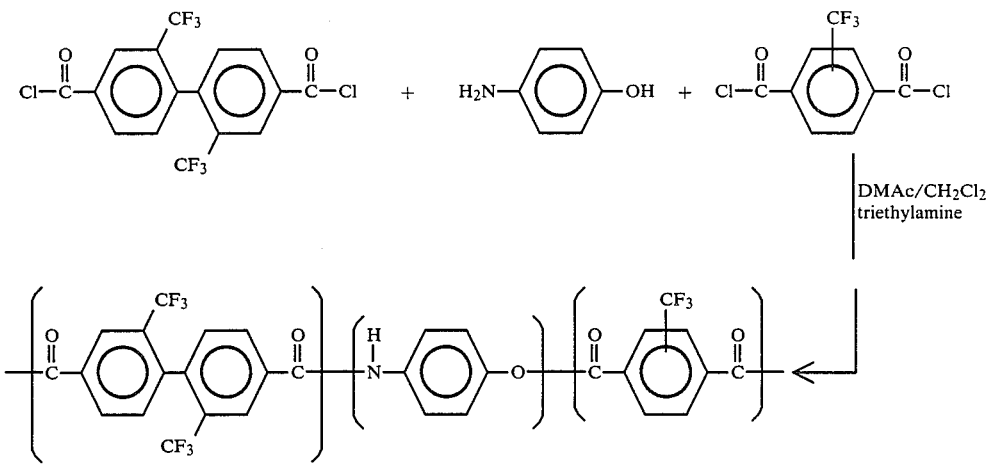

Reaction 1(b)

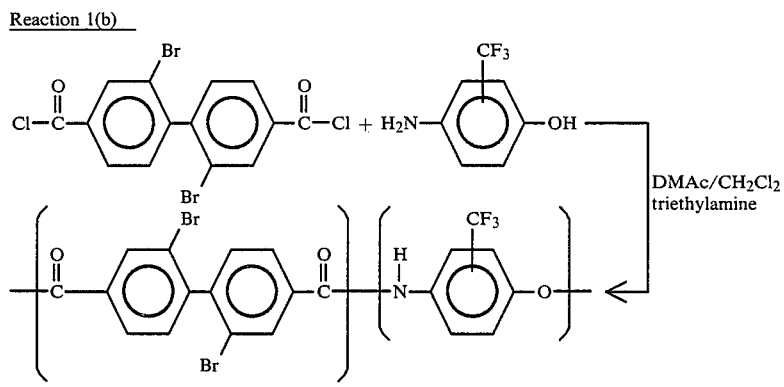

The polyesteramides of the present invention can be conveniently prepared from known monomeric compounds. For example, the 2,2′-bis(trifluoromethyl)4,4′-biphenyl dicarbonyl chloride shown in Reaction 1(a) can be prepared in the manner described in U.S. Pat. No. 4,433,132, issued Feb. 21, 1984 to H.G. Rogers et al. The 2,2′-dibromo-4,4′-biphenyl dicarbonyl chloride can be prepared in the manner described by H.G. Rogers et al. in the aforementioned U.S. Pat. No. 4,384,107, issued May 17, 1983. The 2-trifluoromethyl-1,4-phenylene dicarbonyl chloride shown in Reaction 1(b) can be prepared according to the procedure of Kan Inukai and Yasuo Maki, Kogyo Kagaku Zasshi, 68(2), 315 (1965). The 2-trifluoromethyl-4-aminophenol reactant shown in Reaction 1(b) can be prepared in the manner reported by R. Filler, B.T. Khan and C.W. McMullen in J. Org. Chem., 27, 4660 (1962).

Inclusive of polyesteramides of the present invention are the polyesteramides represented by the following structures wherein indicated subscripts represent the molar amount of the respective repeating unit in the polyesteramide.

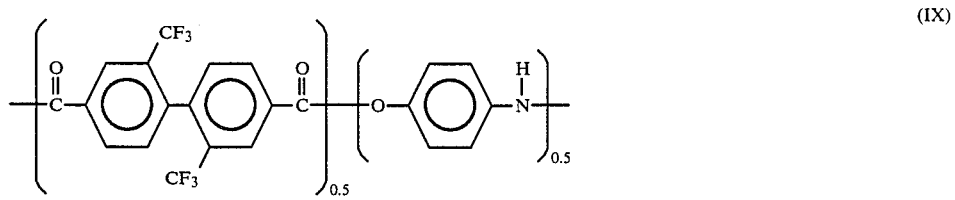

(IX)

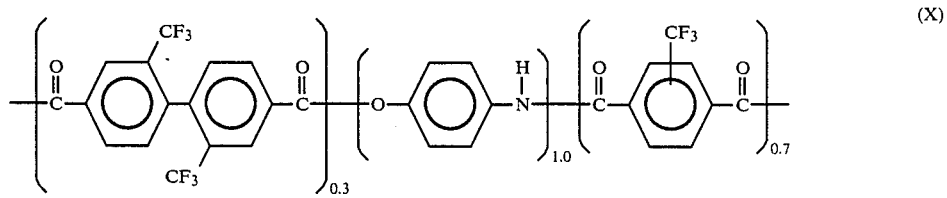

(X)

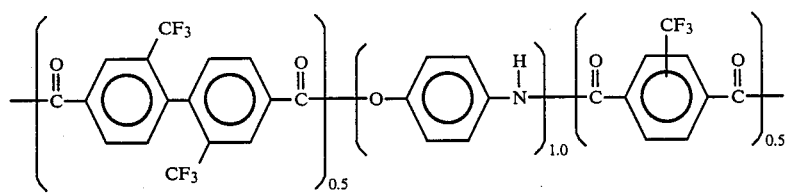
(XI)
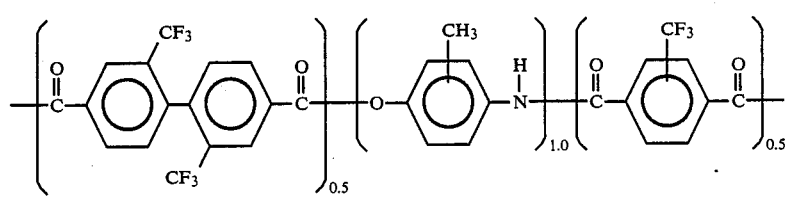
(XII)
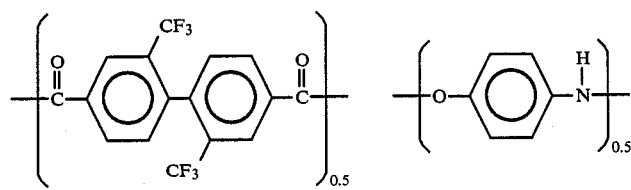
(XIII)
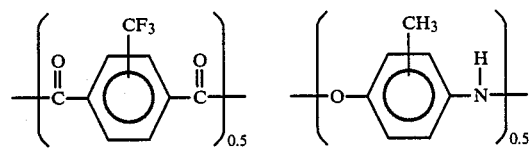
(XIV)
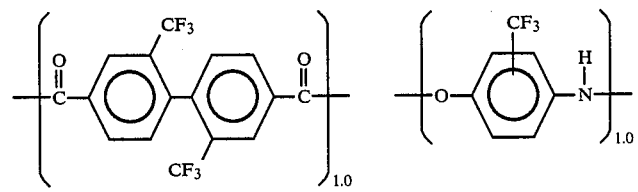
(XV)
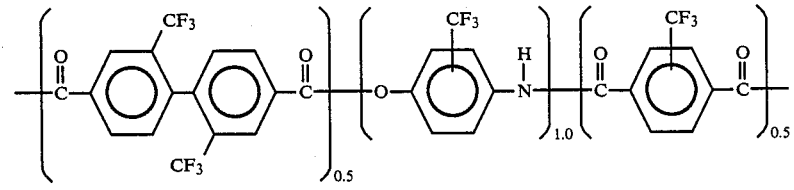
(XVI)
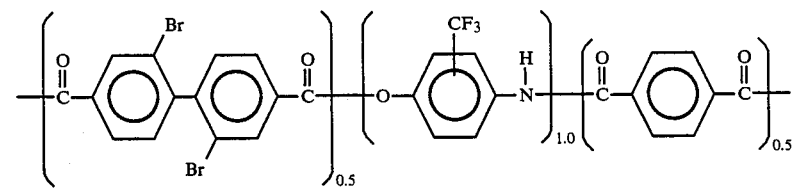
(XVII)

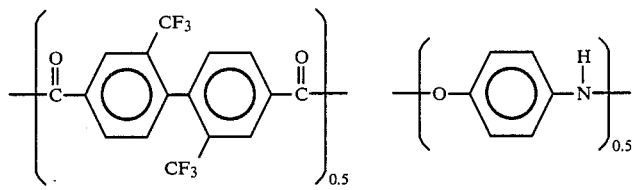
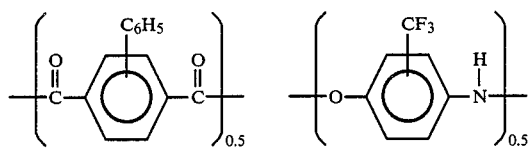

(XVIII)

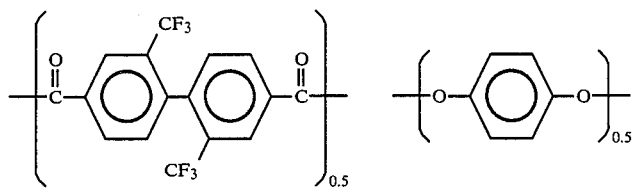
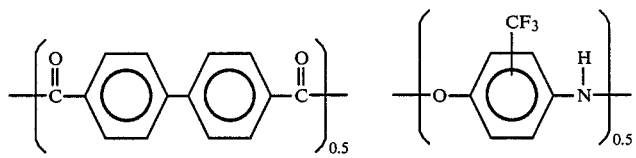

(XVIX)

The polyesteramides of the present invention are especially advantageous from the standpoint of their melt processability which can be conducted at a temperature of about 360° C. or lower, and especially at a temperature of about 300° C. or lower. The melt processability of the polyesteramides of the invention allows for production of polymeric films and layers without the need for solvents or solvent handling and recovery.

The solubility of the polyesteramides in organic solvents also contributes importantly to the physical properties thereof. Solubility of the polyesteramide allows for the production of high molecular weight polymers by solution polycondensation, in contrast to the production of low molecular weight polymers which are formed as the result of inadequate solubility and which show relatively poor physical properties.

The polyesteramides of the present invention can be variously formed or shaped into films, sheets, coatings, layers, fibrils, fibers or the like. Meltcasting, injection-molding and like forming and shaping techniques can be used for this purpose. Films and fibers or other shaped forms of the polyesteramides can be redissolved and reshaped or refabricated if desired. Depending upon the nature of other repeating units as may be present in the polyesteramide materials, the melt-processing characteristics of the polymers hereof can be varied or controlled to suit particular applications.

If desired, a melt of the polyesteramide can be cast onto a suitable support material for the formation of a polymeric film or layer of the polyesteramide material. The polymeric film can be subjected to stretching so as to introduce molecular orientation and provide a film material having a birefringent character.

If desired, the polyesteramides can be formed into fibers, fibrils or the like by melt extrusion methods known in the art. Thus, for example, a melt of the polyesteramide can be extruded into the form of fibers which can be cut, stretched or assembled into fiber tows or bundles as desired.

When a molecular orientation is permanently induced in the polyesteramide material, as by formation of the polyester into an oriented sheet, fiber or other form, the polyesteramide will exhibit optical birefringence which can be measured in accordance with a number of known methods. Known shaping or forming methods can be utilized to induce such orientation. Preferably, this will be accomplished by unidirectional stretching of a polymeric film, by extrusion of the polymer into a sheet, fiber or other stretched form, or by the combined effects of extrusion and stretching. In general, greater birefringence will be observed in the case of polymeric materials exhibiting a greater degree of molecular orientation.

The polyesteramides of the present invention can be utilized in the construction of a variety of optical filter or other devices. Optical devices in which the polyesteramides of the invention can be utilized, and their method for construction and modes of operation are described in detail in U.S. Pat. No. 4,446,305 of H.G. Rogers et al., issued May 1, 1984. Examples of other devices which can be adapted to include a polymeric and birefringent layer as described herein are described, for example, in U.S. Pat. No. 4,506,333 (issued Apr. 14, 1970 to E.H. Land); in U.S. Pat. No. 3,213,753 (issued Oct. 26, 1965 to H.G. Rogers); in U.S. Pat. No. 3,610,729 (issued Oct. 5, 1971 to H.G. Rogers); in U.S. Pat. No. 3,473,013 (issued Oct. 14, 1969 to H.G. Rogers); in U.S. Pat. 3,522,984 (issued Aug. 4, 1970 to H.G. Rogers); in U.S. Pat. No. 3,522,985 (issued Aug. 4, 1970 to H.G. Rogers); in U.S. Pat. No. 3,528,723 (issued Sept.

15, 1970 to H.G. Rogers); and in U.S. Pat. No. 3,582,424 (issued June 1, 1971 to K. Norvaisa).

The following non-limiting examples are illustrative of the present invention. All percentages are by weight except as otherwise indicated.

EXAMPLE 1

This example illustrates the polycondensation of p-aminophenol, 2-2'-bis(trifluoromethyl)-4-4'-biphenyl dicarbonyl chloride and 2-trifluoromethyl-1,4-phenylene dicarbonyl chloride.

A solution was prepared from 1.6365 gm of p-aminophenol (0.015 mole, sublimed) in 12.5 ml of dry dimethylacetamide, 10 ml of methylene chloride and 4.5 ml of triethylamine. The solution was cooled in an ice/salt bath, under nitrogen, to 0° C. To the resulting solution there was added dropwise via a syringe, while maintaining the reaction temperature between 0° to 5° C., a mixture of 2-trifluoromethylterephthaloyl chloride (2.033 gm; 0.075 ml) and 2,2'-bis(trifluoromethyl)4,4'-biphenyl dicarbonyl chloride (3.114 gm; 0.0075 ml) in 15 ml methylene chloride. After stirring for three hours, the reaction mixture was allowed to elevate to room temperature. To the reaction mixture were added 25 mls. of dimethyacetamide to provide a clear, viscous solution which was then precipitated in methanol. A white, fibrous polymer was collected by filtration and was washed with methanol and dried under vacuum. The polymer (5.91 gm; 95%) was a polymer having the structure represented by formula (XI). Inherent viscosity (measured in tetrahydrofuran, at 30° C. and a concentration of 0.5 gm per dl) was 2.96 dl per gram.

The melting temperature of the polymer (in the range of 285° to 300° C.) was determined by hot-stage microscopy using a heated sample positioned between crossed polarizers. The range of temperatures over which the heated sample exhibited melt anisotropy was observed and recorded. Heat-stretched films were prepared for measurement of birefringence. The films were stretched to various lengths and the orientation was measured by infrared dichroism. Orientation parameters of 0.60 to 0.90 were achieved and corresponding birefringence values of 0.40 to 0.70 were measured at 633 nm by Brewster angle. The extrapolated maximum birefringence (order parameter of 1.0) is between 0.80 to 0.90.

EXAMPLES 2 to 7

Using a polycondensation method, substantially as described in EXAMPLE 1, each of the polyesteramides having the repeating units as previously described and identified in TABLE 1 was prepared. Values reported in TABLE 1 for inherent viscosity and melting temperature range were determined using the techniques described in EXAMPLE 1.

TABLE 1

| EX-AMPLE | POLYESTERAMIDE (Formula #) | INHERENT VISCOSITY (dl/g) | MELTING RANGE (°C.) |
|---|---|---|---|
| 2 | (IX) | 3.41 | 350–355 |
| 3 | (X) | 1.87 | 260–265 |
| 4 | (XII) | 2.28 | 280–285 |
| 5 | (XIII) | 2.06 | 270–275 |
| 6 | (XIV) | 0.92 | 265–270 |
| 8 | (XV) | 0.76 | 220–225 |

CONTROL EXAMPLE

For purposes of comparison with the melting temperatures of the polyesteramides of EXAMPLES 1 to 7, a polyesteramide having the following repeating units was prepared:

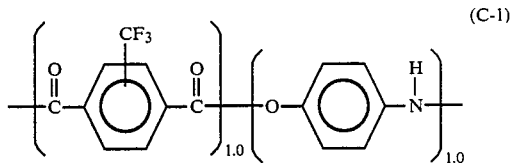

The polyesteramide of formula (C-1) showed an intrinsic viscosity of 1.04 dl/g. Melting point determination showed the polymer simultaneously melted and decomposed at 358° C.

Inspection of the data recorded for the polyesteramides of the invention in TABLE 1 show that, in general, the polyesteramides of the invention are characterized by high molecular weight and that melting temperature ranges suited to melt processability are reported.

What is claimed is:

1. A melt-processable polyesteramide capable of forming an anisotropic melt phase at a temperature of approximately 360° C. or lower, said polyesteramide comprising repeating units (I) and (II), with or without repeating units (III) and (IV), wherein:

(I) is a repeating unit of the formula

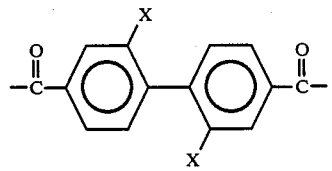

wherein X is a substituent other than hydrogen;

(II) is a repeating unit of the formula

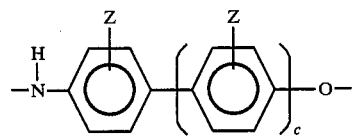

wherein each Z is hydrogen, alkyl, alkoxy, aryl, halogen or trifluoromethyl and c is zero or one;

(III) is a repeating unit of the formula

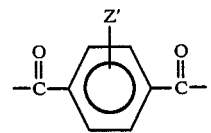

wherein Z' is hydrogen, alkyl, alkoxy, aryl, halogen or trifluoromethyl;

(IV) is a repeating unit of the formula

—Y—Ar—W— wherein Ar is a divalent arylene radical; Y is —O— or —NH— and W is —O—, —NH— or —C(O)—; wherein the total number of equivalents of carboxylic groups in monomeric compounds providing said repeating units (I), (III) and (IV) by polycondensation is equivalent to the total number of equivalents of amino and hydroxyl groups in monomeric compounds providing said repeating units (II) and (IV); wherein the repeating unit of formula (I) is present in an amount of 15 to 60 mole percent of said polyesteramide; wherein the repeating unit of formula (II) is present in an amount of from 30 to 60 mole percent of said polyesteramide; wherein the repeating unit of formula (III) is present in an amount of from 0 to 35 mole percent of said polyesteramide; and wherein the repeating unit of formula (IV) is present in an amount of from 0 to 10 mole percent of said polyesteramide.

2. The melt-processable polyesteramide of claim 1 wherein, in said formula (I) repeating unit, each X is independently halogen, nitro, alkoxy or substituted-alkyl.

3. The melt-processable polyesteramide of claim 2 wherein each of said X groups is a substitutedalkyl.

4. The melt-processable polyesteramide of claim 3 wherein each of said X groups is trifluoromethyl.

5. The melt-processable polyesteramide of claim 1 wherein, in said formula (II) repeating unit, c is zero.

6. The melt-processable polyesteramide of claim 5 wherein, in said formula (II) repeating unit, Z is hydrogen, methyl or trifluoromethyl.

7. The melt-processable polyesteramide of claim 1 wherein, in said formula (III) repeating unit, Z' is hydrogen or trifluoromethyl.

8. The melt-processable polyesteramide of claim 1 wherein the formula (I) repeating unit is present in the polyesteramide at a concentration in the range of from about 25 mole percent to 50 mole percent.

9. The melt-processable polyesteramide of claim 8 wherein the formula (II) repeating unit is present in the polyesteramide at a concentration in the range of from about 40 mole percent to about 50 mole percent.

10. The melt-processable polyesteramide of claim 9 wherein the formula (III) repeating is present in the polyesteramide at a concentration in the range of from about 5 mole percent to about 25 mole percent.

11. The melt-processable polyesteramide of claim 10 wherein the formula (IV) repeating unit is present in the polyesteramide at a concentration of from zero to about 5 mole percent.

12. The melt-processable polyesteramide of claim 10 wherein the concentration of said formula (IV) repeating unit is zero.

13. A melt-processable polyesteramide capable of forming an anisotropic melt phase at a temperature of approximately 360° C. or lower consisting essentially of the repeating units represented in the formula

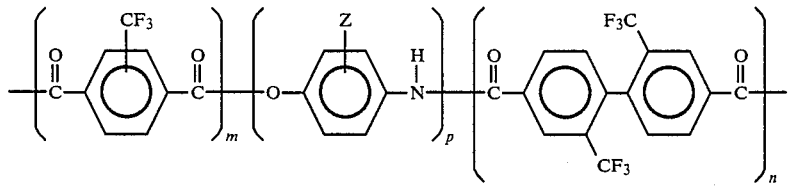

wherein Z is hydrogen, alkyl, aryl or trifluoromethyl, wherein each of m, p and n represents the respective molar amount of each of the repeating units of the polyesteramide and wherein the molar proportions of each of the m, p and n repeating units conform to the following relationship:

$$\frac{m}{m+n} + \frac{n}{m+n} = 1 = \frac{p}{m+n}.$$

14. The melt-processable polyesteramide of claim 13 wherein Z is trifluoromethyl and wherein the molar proportions of the m, p and n repeating units conform to the following relationships:

$$\frac{m}{m+n} = 0 \text{ to } 0.75;$$

$$\frac{n}{m+n} = 0.25 \text{ to } 1; \text{ and}$$

$$\frac{p}{m+n} = 1.$$

15. The melt-processable polyesteramide of claim 14 wherein $$\frac{m}{m+n} = 0.25 \text{ to } 0.75.$$

16. The melt-processable polyesteramide of claim 13 wherein Z is hydrogen, alkyl or phenyl and wherein the molar proportions of the m, p and n repeating units conform to the following relationships:

$$\frac{m}{m+n} = 0.25 \text{ to } 0.75$$

$$\frac{n}{m+n} = 0.25 \text{ to } 0.75.$$

17. The melt-processable polyesteramide of claim 13 wherein Z is hydrogen, methyl or trifluoromethyl.

18. The melt-processable polyesteramide of claim 13 wherein m is zero and Z is trifluoromethyl.

19. The melt-processable polyesteramide of claim 13 wherein Z is hydrogen;

$$\frac{m}{m+n} = 0.25 \text{ to } 0.75;$$

$$\frac{n}{m+n} = 0.25 \text{ to } 0.75; \text{ and}$$

$$\frac{p}{m+n} = 1.$$

20. The melt-processable polyesteramide claim 13 wherein Z is methyl;

$$\frac{m}{m+n} = 0.25 \text{ to } 0.75$$

$$\frac{n}{m+n} = 0.25 \text{ to } 0.75; \text{ and}$$

-continued $$\frac{p}{m+n} = 1.$$

21. The melt-processable polyesteramide of claim 13 wherein Z is trifluoromethyl;

$$\frac{m}{m+n} = 0.25 \text{ to } 0.75;$$

$$\frac{n}{m+n} = 0.25 \text{ to } 0.75; \text{ and}$$

$$\frac{p}{m+n} = 1.$$

22. The melt-processable polyesteramide of claim 13 wherein said p radical comprises a radical wherein Z is hydrogen and a radical wherein Z is methyl.

23. The melt-processable polyesteramide of claim 22 wherein $$\frac{m}{m+n} = 0.25 \text{ to } 0.75;$$

$$\frac{n}{m+n} = 0.25 \text{ to } 0.75; \text{ and}$$

$$\frac{p}{m+n} = 1.$$

* * * * *